Patented Nov. 25, 1930

1,782,964

UNITED STATES PATENT OFFICE

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA

SOLVENT AND METHOD OF MAKING THE SAME

No Drawing.   Application filed October 21, 1924. Serial No. 745,024.

In several copending applications I have described a vapor phase catalytic process for making intermediate partial oxidation products from petroleums or hydrocarbon mixtures from any source, such, for example, as shale oils or oils from the low temperature distillation of coal. Some of such pending applications are Serial No. 272,567, filed January 22, 1919; Serial No. 281,124, filed March 7, 1919; Serial No. 335,939, filed November 5, 1919; Serial No. 435,355, filed January 6, 1921, etc.

These intermediate oxidation products consists mainly of alcohols, aldehydes, aldehyde alcohols and oxygenated acids of aldehydic and hydroxy-aldehydic character, all of several different molecular weights. Some ketonic bodies are also present in the lighter portions of the product, these resulting from thermal decomposition in the process. These products, together with any hydrocarbons which pass through the process unchanged or having been formed by thermal decomposition of oxidized bodies in the reaction or catalytic chamber, form a completely miscible mixture or solution which is of oily character.

Owing to the temperature of these products as they pass from the reaction zone or catalytic contact, I have found that there is a combining of the acids and alcohols in the vapor phase to form esters before the condensation and collecting of the products. If such oxidation products be analyzed for free acids, I find that there is but a small amount of such acids present, while the well known alcoholic potash saponification of the product yields a mixture of acids up to 25 or 30% or even higher. While some acid anhydrides may be present, these in most cases will react with the alkali in the free acid titration above mentioned. Therefore, in my opinion, the acids in this mixture are for the most part bound up in the form of esters. When it is attempted to isolate these different molecular weight acids and to esterify them by known methods, this is found to be of little or no avail, probably due to the oxygenated character of these acids, which, in the presence of saponifying agents, tend to pass readily into resinated forms of such high molecular weight that their esters would have little or no practical value, even if they could be readily made.

The problem then remains to separate the esters which have already been formed, as well as the aldehydes and ketones, all of different molecular weights, from the oxidized oil mixture in which they are completely soluble. Ordinary distillation would not be relied upon as a method of separation, since other congeneric bodies present fall within the same boiling range as the esters themselves.

I have discovered that ordinary (95%) alcohol has the property of dissolving mainly the esters and more highly oxidized bodies from the mixture of partially oxidized oils. However, when such solvent is applied to a product which was more highly oxidized, a complete solution resulted. Further experimenting on this subject has disclosed the fact that if water in carefully regulated amounts be added to the alcohol, the quantity of oxidized bodies taken out of the mixture into the alcohol layer can be nicely controlled.

The components of the partial oxidation mixture most desirable as a commercial solvent for nitrocellulose, gums, etc. consist mainly of the esters, aldehydes and ketones. Therefore by mixing the product with various admixtures of water and alcohol, I have found that I can easily proportion the solvent against this partial oxidation mixture in such a manner that only the more highly oxidized bodies pass into solution in the alcohol layer which is formed; and on drawing off this lower dilute alcohol layer in any suitable manner, I can obtain the alcoholic solution of esters, aldehydes, and ketones. I can then distil off the alcohol, leaving such esters, aldehydes and ketones ready for use as a solvent, either with or without further purification. I have also found that it is usually preferable to remove the water which is present by suitable dehydrating agent before distilling off the alcohol, although this step may be carried out by distillation.

In most cases I have found that there is a very small amount of the ester mixture which falls below 100° C., in fact, I prefer to select the particular fraction of the partially oxidized oil product (preferably made by vacuum distillation) which gives a solvent boiling in the range from 100° to 175° or 200° C., although I may in certain cases carry the range higher by a suitable selection of the partly oxidized oil or fraction thereof for the alcoholic extraction.

When desired, I may remove part or all of the aldehydes and ketones from the drawn off layer of partial oxidation mixture by precipitation, using, for example, sodium bisulphate; but as a rule, this is unnecessary, since distillation, either at atmospheric pressure or preferably in a partial vacuum is sufficient for purification. The aldehydes and ketones are in themselves good solvents, and may usually be retained.

I have referred to the small content of free acids which is present in these partial oxidation mixtures. In order to utilize these free acids, I may complete the esterification by adding a small amount of a suitable esterifying catalyzer, such as hydrochloric acid, and allow the reacting mixture to stand until equilibrium has been attained. It is preferable to allow this reaction to take place at ordinary temperatures, several days being necessary therefor. The hydrochloric acid may be bubbled into the mixture in the form of dry gas, or it may be added in the form of its solution in absolute alcohol, usually 1% of absolute alcohol carrying 25% of hydrochloric acid is ample for the catalyzer. After this esterifying action is practically complete, I may proceed to obtain the esters, aldehydes and ketones from the oxidation mixtures, as above described.

I have also found that (depending on the kind of oil oxidized and the degree of oxidation), I can make a much better product, and may in some cases dispense with any further purification of the product, if the oxidation mixture which I first remove is (after the removal of the first alcohol solvent) again subjected to the alcohol extraction process. This second alcoholic solvent may be much higher in its alcohol content for we can now to good advantage get into the alcoholic layer a larger percentage of the oil treated than in the first extraction.

In this case, I prefer to use an alcohol-water or other available solvent that will take out from 60% to 90% of the oil first extracted. The remaining steps may be the same as those outlined for the first extraction, that is, distillation to remove the alcohol or other solvent, followed, if desirable, by distillation of the extracted oxidation mixture.

Again, I may vary the whole extraction process by first carefully fractionating the complex oxidation mixture by distillation into narrower cuts, in some cases 50° C. or less apart. Then by making a special study of the extractions of each cut, I have found that I can considerably increase the total yield of good product desired over that obtained by any method of extracting applied in the first instance to the total oxidation mixture or to larger oxidation fractions such as the total fraction under 200° C. I believe that this increased yield is possible because where a wider range mixture is extracted, the substances first going into the alcohol layer exert an influence on the solvent action of the alcohol, probably hindering further solutions of valuable compounds. I may catalyze each fraction as before noted in order to increase the ester content, or I may catalyze the whole mixture before distillation, thus proceeding with the extraction in the usual way, and if necessary, making the second extraction noted above.

Where mixtures of exceedingly high values are desired, a third extraction, such as described herein, may be used.

I may, in general, apply the foregoing methods of extraction and purification to the so-called "top layer," thereby increasing the yield of valuable solvent.

By these methods it has been demonstrated that it is possible to make good nitrocellulose solvents, having boiling ranges varying from 100° C. to 250° C. and even higher.

An interesting feature in connection with the property of these mixtures is that they are still oily in character, and hence, more water-repellant than the solvents that have found use in lacquer manufacture up to the present time. This feature makes it possible to apply such lacquer coatings on automobiles for example, on occasions when the humidity of the atmosphere is relatively high.

In addition, these mixtures, extracted as above, dissolve the ordinary varnish gums, as well as nitrocellulose, so that there is available a suitable series of solvents for all phases of the lacquer industry.

The volume of diluted alcohol needed in the above extractions will vary, and is governed by the particular dilution desirable for taking out the desired percentage of partly oxidized products. Generally speaking, I have used amounts of diluted alcohol varying from equal volumes thereof and the oil under treatment down to one-half as much diluted alcohol as partly oxidized oil or fraction, and I have found that where dilution around 10% of water is used on highly oxidized oils, the one-half ratio is preferable. The following examples (single extraction) will illustrate some applications of my process.

Example I 1 liter of partially oxidized kerosene (Pennsylvania petroleum) made in accordance with my vapor phase catalytic process was used. This fraction was subjected to the vapor phase catalytic air oxidation method, and the acids were removed from the product by lime saponification, the non-saponifiable oil being then returned and subjected to the same partial oxidation method. This gives a product having a high content of oxidized bodies, as described in my various co-pending applications.

The partly oxidized product was dried by allowing it to stand over night with 10 per cent of its weight of anhydrous calcium chloride in the containing vessel. Dry hydrochloric acid gas was then passed into the oil for five minutes. The reactions ensuing raised the temperature to about 70° C. The mixture was then heated on the water bath for one hour and allowed to stand over night. Portions of the resulting product were then taken for the extraction test.

The alcohol used was of the grade known as "95 laboratory denatured" and by volume showed the following composition:

90 parts of ethyl alcohol, 5 parts of methyl alcohol, 5 parts of water.

The first stock solution of diluted alcohol was 50 cc. of the 95 alcohol plus 1.25 cc. of water.

The second stock solution—50 cc. of the 95 alcohol plus 2.5 cc. of water.

The third stock solution—50 cc. of the 95 alcohol plus 5 cc. of water.

Extractions 10 cc. of the first stock solution was shaken up with 10 cc. of the above oxidation product, giving complete miscibility, with no separation.

10 cc. of the second stock solution was shaken up with 10 cc. of the above oxidation product and gave 6.8 cc. in the upper or non-alcoholic-soluble layer.

10 cc. of the third stock solution was shaken up with 10 cc. of the above oxidation product and gave 8 cc. in the upper layer.

I then selected the third stock solution and 250 cc. of the dried and catalyzed (HCl) oxidation product was treated with an equal volume of this alcoholic solution. The lower alcoholic layer was drawn off from the upper 80 per cent layer, which upper layer contains usually about 15 per cent of alcohol, and from this lower layer the alcohol and other substances boiling below 100° C. were removed by distillation. Continuing the distillation at atmospheric pressure 20 cc. of the solvent was obtained which boiled from 100 to 175° C., and also 20 cc. was obtained which boiled from 175 to 225° C.

The first fraction boiling from 100 to 175° C. completely dissolved the lacquer type of nitrocellulose, while the second fraction gelatinized the same nitrocellulose. This test shows that about 50 per cent of the above alcoholic extract of the oxidized oil can be worked into nitrocellulose lacquer formulas, this being about 15 per cent of the partly oxidized oil product treated.

Example II

In order to further study the distribution of the constituents of the partial oxidation mixture which have the property of dissolving nitrocellulose, the following extraction was made; there also being introduced a modification of the catalyzing (HCl, etc.) treatment in this case.

500 cc. of the 2–300° fraction of the "rerun" oxidized kerosene product was shaken up with 350 cc. of the third stock solution above recited. This gave an upper oil layer of about 80 per cent. The lower layer was then drawn off and one-tenth cc. concentrated hydrochloric acid solution and 10 grams of anhydrous sodium sulphate was added. The mixture was heated under an invert condenser on a boiling water bath for six hours. On cooling, the solution was filtered from the excess sodium sulphate and the hydrated form thereof which resulted from the dehydration, and was then distilled. The first part of the distillation was carried out at atmospheric pressure to remove the alcohol and substances boiling under 110° C. Vacuum was then applied and at about 3.5 cm. of mercury, the following cuts were made:

|  | cc. |
|---|---|
| First cut up to 125° C. | 27 |
| Second cut 125–140° C. | 21 |
| Third cut 140–160° C. | 22 |

Of these cuts the first one readily dissolved nitrocellulose, while the second and third cuts gelatinized it. As the above distillation was carried out in the vacuum of 3.5 cm. of mercury, the boiling point at atmospheric pressure of the above solvent would run as high as 160° C. However, this is desired in lacquer formulas, and such substances as are known in the lacquer trade as "high boilers" and are desirable in order to secure horn-like films.

It should be noted that the foregoing results and many others of the same character were obtained without any purification of the final solvent product. I may apply any of the methods well known to organic chemists for purifying this material, such as redistillation and vacuum, filtration through fuller's earth, bone black, or activated charcoal, to improve the color and odor of the material. I may also in special cases treat the product, preferably in alcoholic solution, to remove part of the aldehydes and ketones. This may be done by the addition of sodium bisulphite. If an unpleasant odor persists due to a small percentage content of volatile aldehydes, I may resort to the above or similar means for purifying.

Where free organic acids are still present in the final solvent product, I may remove these as, for example, by agitation with pure calcium carbonate and final exact neutralization with sodium carbonate and sodium hydroxide.

While I have referred to my product as a solvent, I do not intend to be limited to such use, as the product obtained may be used for various purposes. By the definition "a liquid partial oxidation product containing hydrocarbon derivatives of different degrees of oxidation," or similar words, in my claims, I intend to cover the product obtained by subjecting mixtures containing aliphatic hydrocarbons, such as petroleum fractions, to oxygen or an oxygen-containing gas under conditions which will introduce oxygen and chemically combine it with the aliphatic hydrocarbons of the mixture treated, the product being an oily liquid mixture containing hydrocarbon derivatives of different degrees of oxidation. By the term "alcohol" in my claims, I intend to including any alcohol or its equivalent.

Other of my copending applications, Ser. No. 520,715 (renewal) filed July 13, 1920; Ser. No. 473,798, filed May 31, 1921, and Ser. No. 702,136, filed March 26, 1924, contain claims relating to fractioning complex mixtures of partial oxidation products such as produced by my partial oxidation process, to a resulting fraction, and to further treating such fraction. Claims thereto are not present herein.

Many variations may be made in my process and in the character and use of the product without departing from my invention.

I claim:

1. In the treatment of an oily partial oxidation product mixture of aliphatic hydrocarbon derivatives of different degrees of oxidation and which already contain artificially-introduced chemically-combined oxygen, the step consisting of dissolving and separating portions thereof by a selective solvent other than water.

2. In the treatment of an oily partial oxidation product mixture of aliphatic hydrocarbon derivatives of different degrees of oxidation and which already contain artifically-introduced chemically-combined oxygen, the step consisting of dissolving and separating portions thereof by a selective solvent other than water having a greater affinity for more highly oxidized bodies than for less highly oxidized bodies.

3. In the treatment of an oily partial oxidation product mixture of aliphatic hydrocarbon derivatives of different degrees of oxidation and which already contain artificially-introduced chemically-combined oxygen, the step consisting of disolving and separating portions thereof by dilute alcohol.

4. In the treatment of an oily partial oxidation product mixture of aliphatic hydrocarbon derivatives of different degrees of oxidation and of different molecular weights and which already contain artifically-introduced chemically-combined oxygen, the steps consisting of fractioning the same and dissolving portions thereof by a selective solvent other than water.

5. In the treatment on an oily partial oxidation product mixture of aliphatic hydrocarbon derivatives of different degrees of oxidation and of different molecular weights and which already contain artifically-introduced chemically-combined oxygen, the steps consisting of fractioning the same and dissolving portions thereof by dilute alcohol.

6. In the treatment of an oily partial oxidation product mixture of aliphatic hydrocarbon derivatives of different degrees of oxydation and which already contain artifically-introduced chemically-combined oxygen, the steps consisting of removing a group or groups of compounds and then applying to the remainder a selective solvent other than water.

7. In the treatment of an oily partial oxidation product mixture of aliphatic hydrocarbon derivatives of different degrees of oxidation and which already contain artifically-introduced chemically-combined oxygen, the steps consisting of esterifying the mixture and then treating it with a selective solvent other than water.

8. As a new composition of matter, a dissolved-out portion of a partial oxidation product mixture of aliphatic hydrocarbons containing artificially-introduced chemically-combined oxygen to different degrees of oxidation, obtained by applying a solvent other than water to said partial oxidation product mixture.

9. As a new composition of matter, a dissolved-out portion of a partial oxidation product mixture of aliphatic hydrocarbons of different molecular weights containing artificially-introduced chemically-combined oxygen, to different degrees of oxidation, obtained by applying a solvent other than water to said partial oxidation product mixture.

10. As a new composition of matter, a dissolved-out portion of a partial oxidation product mixture of aliphatic hydrocarbons containing artificially-introduced chemically-combined oxygen to different degrees of oxidation extending through a limited fractionated range, obtained by fractioning and applying a solvent other than water to said partial oxidation product mixture.

11. As a new composition of matter, a dissolved-out portion of a partial oxidation product mixture of aliphatic hydrocarbons containing artificially-introduced chemically-combined oxygen to different degrees of oxidation, obtained by applying a solvent other than water to said partial oxidation product mixture, said portion being substantially free from acids.

In testimony whereof I have hereunto set my hand.

JOSEPH HIDY JAMES.